United States Patent [19]

Holden

[11] 3,743,781
[45] July 3, 1973

[54] METHOD FOR INCREASING LIFE OF PLASMA ARC ELECTRODES
[75] Inventor: Calvin B. Holden, Doylestown, Ohio
[73] Assignee: PPG Industries, Inc., Pittsburgh, Pa.
[22] Filed: May 6, 1970
[21] Appl. No.: 35,004

Related U.S. Application Data
[60] Division of Ser. No. 683,839, Nov. 17, 1967, Pat. No. 3,558,274, which is a continuation-in-part of Ser. No. 400,644, Oct. 1, 1964, abandoned.

[52] U.S. Cl. .................. 219/383, 13/18, 23/204, 219/75
[51] Int. Cl. .................................. H05b 7/18
[58] Field of Search .................. 219/383, 75; 13/18, 13/14; 23/202, 204; 204/164

[56] References Cited
UNITED STATES PATENTS
1,128,640  2/1915  Von Wilmowsky ................ 219/383
2,769,079  10/1956  Briggs ................................. 219/75
3,099,614  7/1963  Sheer et al. ......................... 204/164
3,371,189  2/1968  Kameny et al. .................... 219/383
3,461,190  8/1969  Kameny et al. ................. 219/383 X
3,558,274  1/1971  Holden .............................. 23/202

Primary Examiner—Volodymyr Y. Mayewsky
Attorney—Chisholm and Spencer

[57] ABSTRACT

Operating life of electrodes used in electric arc heaters is increased by utilizing electrodes having less than 0.0005 volume percent voids of at least 0.019 inch in any dimension in the area contacted by the arc. Ultrasonic testing is used to determine the acceptability of the electrodes for the uses described, e.g., heating corrosive gases, such as oxygen. Use of such electrodes in a process for producing pigmentary metal oxides is also described.

4 Claims, 1 Drawing Figure

Patented July 3, 1973 3,743,781
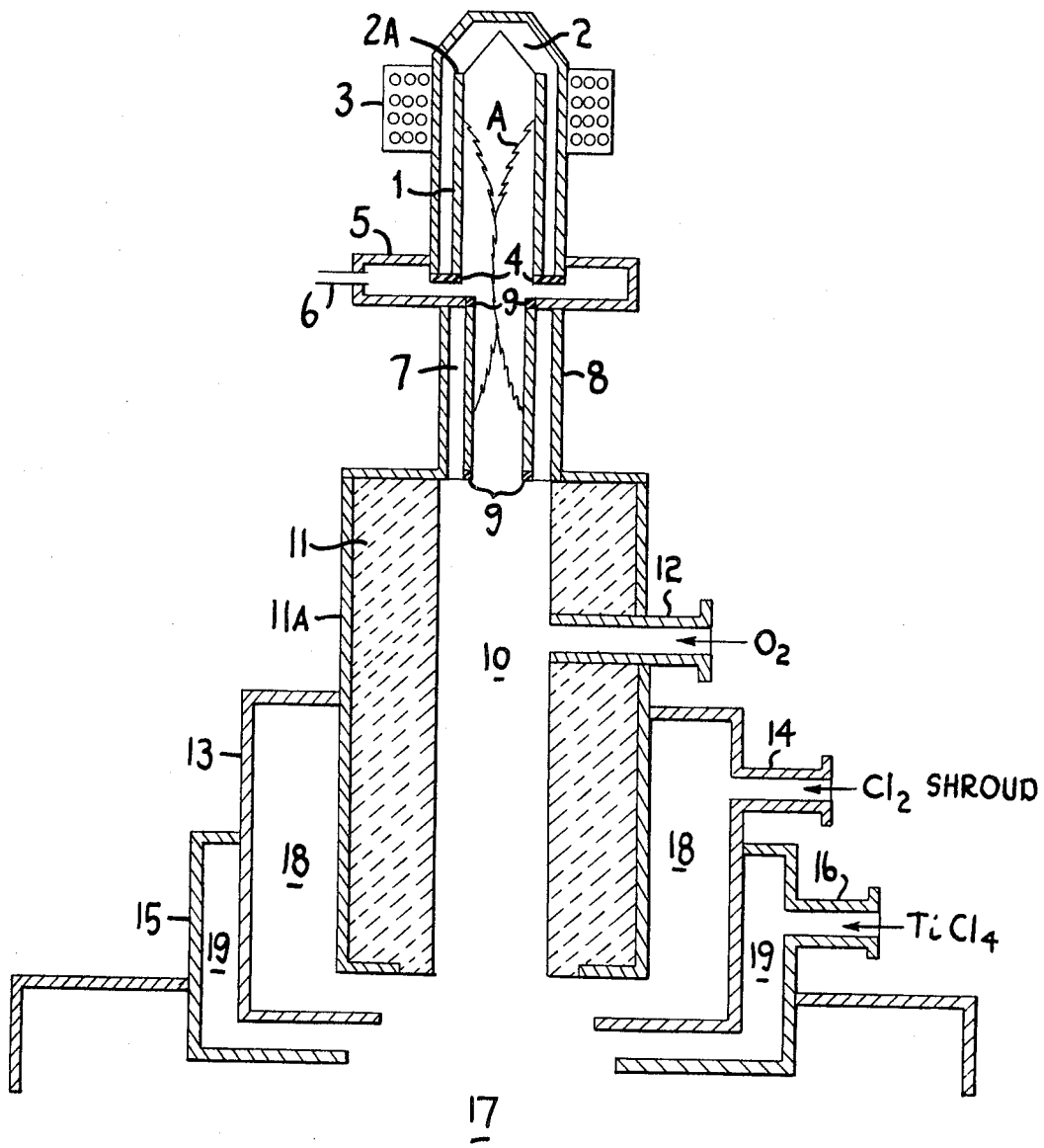
INVENTOR
CALVIN B. HOLDEN
BY
ATTORNEYS

METHOD FOR INCREASING LIFE OF PLASMA ARC ELECTRODES

CROSS-REFERENCE TO RELATED APPLICATIONS

This application is a division of my application Ser. No. 683,839, filed Nov. 17, 1967, (now U.S. Pat. No. 3,558,274) which is a continuation-in-part of my application Ser. No. 400,644, filed Oct. 1, 1964, which is now abandoned.

BACKGROUND OF THE INVENTION

In the production of metal oxides by vapor phase oxidation of at least one metal halide, metal halide is oxidized by reaction with an oxygenating gas, e.g., oxygen, air, oxygen-enriched air, or an oxidizing gas, such as $N_2O_5$, $NO_2$, $NO$, $H_2O_2$, or mixtures thereof, in a reaction zone maintained at temperatures at which the halide and oxygenating gas react. Where the reactants are, for example, $TiCl_4$ and $O_2$, the temperature of reaction is above 500° C., preferably 800° C. to 1,600° C. The reaction can be conducted in the presence of a fluidized bed, such as disclosed in U.S. Pat. No. 2,828,187 to Evans et al., or in a reaction chamber, such as disclosed in U.S. Pat. No. 2,333,948 to Muskat.

Although the reaction of metal halide with oxygen is typically exothermic, a great deal of the evolved heat is carried away from the reaction zone by the effluent product stream or lost through the reactor walls, and accordingly, large quantities of heat are usually added both to initiate and to sustain the oxidation reaction on a continuous level.

It has been suggested to supply heat to the reaction zone by converting electrical energy into heat. See, for example, British Patent Specification 1,035,191. One such method is to pass a gas through an electric arc conducted between electrodes and forward thus heated gas to the reaction zone. However, when corrosive gases are heated by this method, the useful life of conventional electrodes, e.g., copper, is relatively short and contamination of the vapor phase oxidation product with eroded electrode material can result. For example, the use of a corrosive gas such as oxygen, air, carbon monoxide, carbon dioxide, etc., can cause rapid deterioration of the electrodes and undue contamination of the metal oxide product. Moreover, frequent shutdown to replace electrodes is economically detrimental to the process.

SUMMARY OF THE INVENTION

This invention relates to the production of metal oxides, notably pigmentary metal oxides, and, in particular, relates to the production of finely-divided white metal oxides, e.g., pigmentary titanium dioxide, by the vapor phase oxidation of at least one metal halide, e.g., titanium tetrachloride. More particularly, this invention relates to vapor phase oxidation processes wherein heat supplied for such reaction is provided, in part, by converting electrical energy into heat energy. Still more particularly, this invention relates to prolonging the life of electrodes used in arc plasma heaters used for heating corrosive gases, such as oxygen, by selecting as the electrodes those which are homogeneous and essentially void free as further defined herein.

BRIEF DESCRIPTION OF THE DRAWING

The accompanying drawing is a cross-sectional view of gaseous plasma generating apparatus mounted atop burner mixing apparatus that is used for mixing vapor phase oxidation reactants, particularly those used in the production of pigmentary titanium dioxide.

DETAILED DESCRIPTION

In the practice of the present invention, heat is supplied to the vapor phase oxidation reaction zone of metal halide and oxygenating gas by means of a highly heated gas, e.g., a gaseous plasma deriving its heat from the conversion of electrical energy into heat energy. The production of such hot gas can be accomplished by passing a gaseous stream such as metal halide, oxygenating gas, or inert gas through an electric arc created by the passage of electricity between two or more electrodes.

Plasma as employed herein is defined as a collection of approximately equal numbers of mobile positive and negative charges. It is necessary that the size of the volume over which a localized imbalance of charges exists—which varies inversely with the charge density—be relatively small with respect to the total plasma volume.

Since a gaseous plasma contains approximately equal numbers of positive and negative charges, it is electrically neutral. In a gas plasma, the conditions which will produce the required population density of charges are characteristic of high temperature and/or low pressure. In the practice of this invention, there is utilized a high temperature flowing system.

A gas plasma has many valuable and unusual properties such as the ability to interact with and be affected by electrical and magnetic fields. Furthermore, it is opaque to certain radiation, and it also radiates with several particular wavelengths, as well as over a broad spectrum, in the manner of a black body.

As a gas flows through the heating zone of a plasma generator, there will be an increase of energy in the gas which will be based not only on the thermal energy of the gas, but also molecular dissociation and ionization, that is, a certain percentage of the gas molecules will be dissociated and some atoms will be ionized by passage through the heating zone. Such dissociation and ionization requires energy input which does not increase the thermal energy of the gas, but becomes dissociation and ionization energy. However, when the gas stream is subsequently cooled and the molecules recombine, this energy is freed and is then added to the thermal energy of the gas stream.

In the operation of a plasma generator utilizing electrodes between which an electric arc is conducted, it has been found that the life of the arc electrodes, especially the cathode, is frequently very short; that is, one or more of the electrodes is subject to rapid deterioration, vaporization and consumption. This is particularly true when the electrodes are subjected to a corrosive environment as in the heating of an oxygenating or reducing gas. Such electrode deterioration is most unsatisfactory, particularly when the plasma generator is employed in conjunction with a metal halide vapor phase oxidation process. This is so because particles vaporized from the electrodes are carried into the vapor phase oxidation zone; cause contamination of the metal oxide product; and prevent the production of a pigmentary metal oxide of high tinting strength. Although it is possible to limit such deterioration and increase electrode life by the use of magnetic fields placed around the electrodes, rotating or moving electrodes, cooling the electrodes and/or using a shielding gas stream, such methods are only partially effective.

In the practice of the present invention, it has been found that the useful operating life of an electrode utilized in an electric arc heater device is prolonged and increased, and the production of highly pigmentary metal oxide is enhanced by the use of at least one arc electrode constructed of a homogeneous material relatively free from voids and slag inclusions. This has been found to be especially true when such electrode is used as the cathode. Void as used hereinafter is defined as comprising a gas or vacuum bubble, slag inclusion, pinhole, crack, crater, cavity, phase discontinuity, and/or other non-homogeneity in the electrode material.

In particular, it has been found that electrode life is increased by at least 500 percent, often in excess of 2,000 percent, by employing an electrode which is substantially void free in that area or portion of the electrode where the arc terminates (strikes) or falls. Since the surface in said area will be gradually vaporized, worn down, and eroded by arc operation, the electrode subsurface should also be essentially void free at least to the allowable erosion depth. Thus, that portion of the electrode normally in contact with the arc and subject to the consumption by the arc is void free.

In a preferred embodiment, it has been found that such electrodes should be substantially free of voids greater than a standard void of 0.019-inch diameter, preferably not greater than about 450 microns, in width, breadth, depth, axis, or diameter, i.e., in any dimension, especially within that portion to be eroded and consumed by the arc, usually two-thirds of the overall depth or thickness of the electrode material measured from that surface contacted by the arc.

In a further preferred embodiment, that portion of the electrode material to be eroded and consumed by arc operation should contain less than about 0.0005 volume percent of voids having an effective size (equal to or greater than) at least that of the aforementioned smallest standard void. More preferably, the volume percent of such voids should not be greater than about 0.0001 volume percent, advantageously less than about 0.00005 volume percent. In calculating the aforementioned volume percent voids, it is assumed that the void or discontinuity is a sphere. Thus, any lamination crack, crater, cavity, etc. that is indicated to have a dimension of, for example, 0.019 inch, is assumed to be a sphere of 0.019 inch in diameter and, therefore, has a volume equal to a sphere of 0.019 in diameter.

The electrode can be fabricated by extrusion (drawing) or casting (vacuum or continuous). It has been found that a more homogeneous mass suitably free of voids is readily obtained by vacuum casting and selection of that portion of the billet least likely to contain voids. Mechanical working of the metal, as by extrusion, has been shown to reduce the residual voids, if any.

The electrode is typically constructed of a pure metal or alloy of metals having a sufficiently high melting point, e.g., above 600° C., and a thermal conductivity of at least 0.10 calorie centimeters per second per centimeter squared per degree Centigrade (cal. cm./sec. cm.$^2$ ° C.). Generally, if the metal or alloy has a low thermal conductivity, e.g., around 0.10, then the melting point should be higher. However, where the thermal conductivity is high, the melting point may be lower. In the practice of this invention, the product of the melting point in degrees Centigrade and the thermal conductivity in calorie centimeters per second per centimeter squared per degree Centigrade should yield a numerical product of at least 200, preferably above 300.

Thus, metals such as beryllium, chromium, cobalt, gold, manganese, nickel, platinum, silicon, silver, copper, titanium, tungsten, zirconium, tantalum and molybdenum can be employed, as well as alloys of such metals. Examples of alloys which can be employed are beryllium-copper, e.g., about 2 weight percent beryllium and about 98 weight percent copper, nickel-copper, silver-copper, chromium-nickel, chromium-vanadium, hafnium-zirconium, silver-gold, vanadium-tantalum, chromium-molybdenum, titanium-zirconium, as well as platinum-coated titanium.

A preferred metallic material is a silver or silver-copper alloy. Thus, a preferred material will contain from about 72 to 100 percent by weight silver and about 28 to 0 percent by weight copper. Preferred compositions of this alloy, i.e., 72 to 99 weight percent silver and 28 to 1 weight percent copper, include: about 80 weight percent silver and 20 weight percent copper; 72 weight percent silver and 28 weight percent copper; and 90 weight percent silver and 10 weight percent copper. Such compositions are generally measured to within ±1 weight percent. Such materials will typically have a bulk density of about 9.7 to 10.0 grams per cubic centimeter.

The nature (quantity and relative size) of voids present in an electrode is determinable by nondestructive testing of which a preferred type is ultrasonic inspection. In such a test, ultrasound (1 to 10 megacycles) generated at a desired frequency by an electrorestrictive transducer is propagated through a couplant, usually water or oil, into and through the material under test. The ultrasound passes through the electrode and, if not reflected by voids, discontinuities or other non-homogeneous areas, is reflected from the back face of the electrode. Reflections of the propagated ultrasound are detected by a receiving transducer and converted to electrical impulses which are depicted on a cathode tube (oscilloscope). The magnitude of the discontinuities (voids) encountered by the ultrasound is indicated by the height of the peaks displayed on the oscilloscope. Such peaks are located between the peaks representing the front and back face of the electrode. The location of discontinuities within the material is indicated by spacing between the peaks.

In the examples presented hereinafter, the voids or discontinuities were measured by a Branson SONORAY instrument, Model 50, manufactured by Branson Instruments, Inc., of Stamford, Connecticut. A half-inch diameter ceramic zirconate transducer of five megacycles frequency was utilized as the ultrasound source. The standard (test block) against which the instrument was calibrated was a silver-copper tube of about 80 weight percent silver and 20 weight percent copper and had about the same dimensions as electrode 1 in Example I. Three cylindrical flat bottom holes were drilled along the inner wall surface to a depth of one-sixteenth inch such that there was about a three-sixteenth inch deep metal access path for the measuring wave. The respective diameters of the cylindrical flat bottom holes were 0.019, one thirty-second and one-sixteenth of an inch. The SONORAY 50 instrument was adjusted to read 1½ vertical scale divisions (out of 10 major divisions full scale) for the 0.019-inch diameter standard hole; five for the 1/32-inch diameter standard hole; and nine for the 1/16-diameter standard hole. The surfaces of the test electrodes and the test block were generally uniform and typical of a smoothly machined surface.

In ultrasonically examining the test electrodes, the test piece was immersed in a water-filled tank on mechanized, variable speed rollers. Inspection was longitudinal wave, pulse echo (the ceramic zirconate crystal was normal to the entrance surface of the test piece).

In the generation of an electric arc, two or more electrodes are usually used. Many electrode design variations and geometric arrangements are feasible. When direct current is used, one electrode is selected as the cathode and the other as the anode. When alternating current is used, each electrode alternates as the cathode and anode.

In the accompanying drawing, there is shown an arrangement for the production of titanium dioxide by vapor phase oxidation of titanium tetrachloride and particularly for the heating of an oxygen stream with an electric arc conducted between electrodes, one or both of which can be of the void-free character referred to hereinabove.

Referring to the drawing, there is shown an upper or back electrode 1 in the form of a cylinder surrounded by a water cooling jacket 2 through which water or any suitable cooling medium can be circulated by any convenient and conventional means. The water inlet and outlet for the jacket are not illustrated. Surrounding the electrode cooling jacket 2 is a magnetic field coil 3 which serves to stabilize the upper end of the arc at electrode 1 and extend the life of electrode 1 by keeping the upper termination of the arc moving by means of the rotational vector produced by interaction of the magnetic field with the arc current.

There is also shown a lower or front electrode 8 in the shape of a cylinder surrounded by cooling jacket 7. Electrode 8 is coaxial to electrode 1 but is shown as having a smaller diameter than electrode 1. When alternating current is employed, insulation means 9 are provided at each end of electrode 8 and insulation 4 provided for electrode 1. When direct current is used, it is more convenient to operate with insulation removed so as to ground one electrode, e.g., insulation 9 is removed from electrode 8.

In the production of metal oxides by vapor phase oxidation of metal halide, e.g., titanium tetrachloride, an oxygenating gas, such as oxygen, is fed through at least one jet inlet 6 at a high velocity, e.g., the speed of sound, tangential to the inner wall of cylindrical casement or swirl chamber 5 which is located between the lower portion of electrode 1 and the upper portion of electrode 8. Although the drawing illustrates the use of one tangential gas jet inlet 6, it is also possible to employ a series of tangential inlets, such as is shown in U.S. Pat. No. 2,819,428. Also, see U.S. Pat. Nos. 1,443,091 and 2,769,079.

The oxygen flows as a swirling stream within chamber 5 and accelerates as it swirls in a decreasing circular path. The swirling stream exits from the chamber 5, the exit path leading upwardly into the inside of the large diameter electrode 1 and flows initially upwardly around the inside circumference of electrode 1. As the oxygen stream reaches the blocked end 2A of back or upper electrode 1, it is turned downward into a still smaller circular path. Such smaller path is defined by the diameter of front electrode 8. Eventually, the oxygen passes through electrode 8 and through to the reaction chamber 17. Thus, the stream flows downwardly from the back of electrode 1 in a swirling helical path through electrode 8. As the oxygen passes through the electrodes, the arc passes along the ionized pathway in the gas. A portion or all of the oxygen will be ionized and an oxygen plasma will be produced whereby the gas is rendered conductive and electric current can continue to flow between the electrodes.

After the oxygen is heated by means of electric arc A, it passes downwardly into passage 10 wherein it can be, if desired, mixed and cooled with cooler secondary oxygen introduced through nozzle means 12. The secondary oxygen, when used, is of sufficient temperature and quantity so that the resulting mixture of the two oxygen streams has an average temperature in excess of about 1,900° C., usually not greater than about 2,500° C.

There is also shown tubes 13 and 15 which are coaxial with and concentric to passage 10. Passage 10 is insulated from tubes 13 and 15 by means of ceramic refractory 11 supported and retained by wall 11A.

The mixed oxygen stream passes out of passage 10 into the vapor phase oxidation reaction zone chamber 17, the stream being externally surrounded by a concentric chlorine stream or inert gas shroud emitted from the annulus 18 of concentric tube 13. The chlorine stream is in turn externally surrounded by a concentric stream of metal halide, e.g., titanium tetrachloride, emitted from annulus 19 of concentric tube 15. Nozzle 16 is provided for introducing the titanium tetrachloride into the upper portion of annulus 19 of concentric tube 15. Nozzle 14 is provided for introducing the chlorine into the upper portion of annulus 18 of tube 13.

Although the above process has been disclosed as utilizing a secondary oxygen stream, such secondary stream can comprise an inert gas, that is, a gas which is chemically inert to the reaction of the metal halide and oxygen. Likewise, the stream can comprise carbon monoxide in which case combustion of the carbon monoxide to carbon dioxide will take place within passage 10, thereby adding further heat to the process. To prevent flash-back, that is, burning of carbon monoxide within tube 12, the primary oxygen must be introduced at a substantially higher velocity than the carbon monoxide, such that the oxygen stream tends to aspirate and draw the carbon monoxide out of tube 12. In a preferred practice of the process, a secondary stream is not employed but rather the heated gas from the arc is flowed from the reaction zone without any dilution or cooling other than by unavoidable heat loss through refractory 11.

In one method of operation, a direct circuit is employed with back electrode 1 as the cathode and front electrode 8 as the grounded anode. Since the cathode (electrode 1) is constantly subjected to a relatively cool gas, e.g., swirling oxygen from swirl chamber 5, it is not subject to attack from hot gases (heated oxygen) as is the anode (electrode 8). However, the cathode is subjected to a higher electron and ion erosion than the anode since the arc termination point is more localized on the cathode. Furthermore, when the electrode metal is subjected to positive ion bombardment, a secondary erosion process (sputtering) causes some of the surface metal particles to be ejected and results in gradual disintegration of the surface. It appears that such sputtering is due in part to the evaporation and/or diffusion of metal from points of high local surface temperature produced by the impacting positive ions. In addition, a small portion of the gas (oxygen) entering chamber 5 is aspirated down through and along the inner walls of electrode 8 by the swirling heated gas stream passing through electrodes 1 and 8. This gas is relatively cooler than the heated gas and tends to protect the electrode from the heated gas stream. However, the amount of protection afforded by this gas shroud is insufficient to completely protect the electrode.

In operating the device described, the arc can be initiated by a striker mechanism, usually constructed out of carbon or copper, which is inserted temporarily and then withdrawn. Thus, a solid carbon rod can be inserted between the electrodes so as to cause temporary current flow from the cathode, e.g., electrode 1, to the bottom portion of swirl chamber 5. The striker rod is then withdrawn leaving an arc across electrode 1 and swirl chamber 5. This arc is gradually shifted by the drag of the incoming tangentially introduced gas such that it moves to the center line of electrodes 1 and 8.

Another method for initiating the arc is to place a metal or carbon fuse between electrodes 1 and 8. The fuse is permitted to burn out and be consumed by the resulting high current flow.

The voltage requirements for the plasma generator will generally increase with an increase in gas flow, the exact voltage per volume of gas flow being a function of the over-all configuration and design of the system. In the configuration disclosed in the drawing and for a particular rate of production, the voltage requirements ranged from 250 to 1,500 volts. The current requirements ranged from 20 to 200 amps, typically 80 to 150 amps, but varied as the power demands changed in accordance with the desired enthalpy of the gas stream. The power input to the system varied from about 75 to 200 KW.

The gaseous plasma generator can be employed to heat any gas supplied to the reaction zone, that is, any inert gas or metal halide reactant, as well as the oxygenating gas. By inert is meant any gas which is chemically inert with respect to the vapor phase oxidation reaction. Examples of inert gases which can be used in this process are argon, nitrogen, helium, krypton, xenon, chlorine, carbon dioxide, sulfur dioxide, or a mixture of same. Some of the reaction zone inerts, e.g., chlorine, are not inert with respect to the electrodes. Where such a gas is being heated, the electrode material must also be able to withstand the corrosive environment created by the presence of such heated gas.

It is preferred, when only one plasma generator is used, that the central stream from the concentric tube arrangement be the stream passed through and heated by the arc. The central stream, preferably an oxygenating gas such as oxygen, is introduced into the reaction zone from tube 10 at a linear velocity substantially higher than that of the other gas streams such that the higher velocity central stream serves to aspirate and merge the lower velocity externally concentric streams, e.g., chlorine and titanium tetrachloride, into it thereby achieving instantaneous and intimate mixing of the reactant streams within the reaction zone. By introducing an inert gas stream, such as chlorine, internally concentric to one reactant and externally concentric to the other, that is, from annulus 18, premature reaction of the titanium tetrachloride and oxygen near the burner outlets is prevented since the inert gas serves as a shroud between the other gas streams.

If an inert gas stream is heated by an electric arc, it is also possible to simultaneously preheat one or more of the reactant streams, e.g., titanium tetrachloride and oxygen, either by separate electric arc apparatus or by other means. If the reactants are to be premixed and added to the reactor in one stream, the temperature of the stream of the reactants should be maintained below about 400° C. in order to prevent premature reaction and encrustation with reaction products in the annulus or tube through which the mixture is introduced. Thus, in one embodiment, the reactants (e.g., titanium tetrahalide and oxygen) are premixed and introduced into the reactor at a temperature below the reaction temperature. An inert gas (e.g., nitrogen) which has been heated above the reaction temperature by passage through the plasma generator is introduced into the reactor and mixed with the premixture of reactants thereby causing pigmentary metal oxide to be formed.

The inert gas can be mixed with reactants in any of several ways and can be introduced into the reaction zone at any desired point and direction. One preferred technique introduces the inert gas stream in a direction which is transverse or perpendicular to the feed direction of the reactant's stream, e.g., where one stream is introduced at the top of the reactor, the other stream is introduced at the side of the reactor transverse to the stream entering at the top. In such embodiment, it is also preferred that the stream introduced at the side of the reactor be introduced radially and symmetrically about the stream or streams from the top.

The plasma generator can be employed to heat the gas stream passing through it to temperatures initially as high as 30,000° C. The exact initial temperatures to which the gas stream is heated by the plasma generator will be a function of many factors, including heat losses from the system, as well as gas velocity. Thus, to reach very high temperatures and enthalpy, the gas velocity must be relatively slow. Thus, where titanium tetrahalide and oxygen are being reacted in the vapor phase at elevated temperatures to produce pigmentary titanium dioxide, sufficient heat energy should be imparted to the gas stream heated by the plasma generator, e.g., an oxygenating stream, such that there is established and maintained in the reaction zone a temperature above 700° C., preferably in the range of 700° C. to 1,600° C. The enthalpy of the oxygen as it enters the reaction zone should be greater than 600 British Thermal Units per pound, preferably from 1,000 to 2,500 British Thermal Units per pound.

When oxygen is heated to initial temperatures of 1,600° C. to 30,000° C. by apparatus such as illustrated in the drawing, the quantity of secondary oxygen, inert gas, or carbon monoxide added at inlet 12 ranges from 0 to 35 times the mass per unit time of the oxygen heated by the arc.

Regardless of which gas stream is heated by the plasma generator, the molar ratio of oxygen to metal halide within the reaction zone is 0.90 to 2.0. Preferably, the oxygen is in an excess amount ranging from 1 to 50 mole percent based on the metal halide. Reactor pressures can range from 10 to 150 pounds per square inch absolute, usually from atmospheric to about 25 pounds per square inch absolute.

Pigment which has been prepared in accordance with the hereinabove-described process can be further treated in accordance with the coating procedures described in U.S. Pat. No. 3,146,119, or in accordance with the invention of Dr. Neil C. Goodspeed, U.S. application Ser. No. 370,349, filed May 26, 1964.

The present process is more particularly described in the following examples which are intended as illustrative only, since numerous modifications and variations thereof will be apparent to those skilled in the art.

EXAMPLE I

In a titanium tetrachloride vapor phase oxidation process utilizing apparatus similar to that illustrated in the drawing, a direct current arc was struck between electrodes 1 and 8, the current in the arc being 94 amps. Each electrode was a deep drawn cylinder constructed of an alloy consisting essentially of 79.60 percent by weight silver and 20.40 percent by weight copper. Electrode 1 was employed as the cathode and electrode 8 was employed as the anode. Insulation 9 was removed from around electrode 8 and this electrode grounded.

The anode, that is, front electrode 8, had a length of about 8.4 inches, an outside diameter of 1.245 inches, a wall thickness of about 0.24 inch and an initial weight of 1067.7 grams. The cathode, back electrode 1, had a length of about 8.6 inches, an outside diameter of 1.700 inches, a wall thickness of about 0.225 inch, and an initial weight of 1,551.1 grams.

Each electrode was ultrasonically tested before initial use and found to be free of any voids above about 480 microns (0.019 inch), but were found to contain a few insignificant voids below 480 microns. Observations of the amplitude of the Branson SONORAY 50 oscilloscope signal above the base line indicated that there were two voids below about 254 microns plus a few smaller insignificant voids. Electrode 1 was also tested prior to use for voids by means of X-ray photograph; however, examination of the X-ray film did not reveal the presence of any voids.

Oxygen at about 20° C. was tangentially introduced into swirl chamber 5 through four jet inlets 6 at 75 to 125 pounds per square inch absolute pressure, a rate of 24 gram-moles per minute, and a linear velocity equal to the speed of sound. The temperature of the oxygen stream immediately after its passage through the arc was about 2,650° C., equivalent to an enthalpy of about 1,720 BTU (British Thermal Units) per pound of oxygen.

The heated oxygen stream was then mixed with a secondary supply of oxygen introduced through inlet nozzle 12 at about 20° C. and 17 pounds per square inch absolute pressure and at the rate of about 13.2 gram-moles per minute at 20° C. The resulting temperature of the two oxygen streams after mixing was about 2,150° C., equivalent to an enthalpy of 1,150 BTU per pound of oxygen.

The resulting oxygen mixture was fed as a continuous stream into reactor chamber 17. Simultaneously, there was introduced 32 gram-moles per minute of titanium tetrachloride at 420° C. through tube 15. Also, 5 gram-moles per minute of chlorine at 150° C. was added through tube 13 to provide a chlorine shroud between the oxygen and the titanium tetrachloride streams. The total oxygen thus added was an excess of 16 mole percent based on the amount of oxygen theoretically required to convert titanium tetrachloride to titanium dioxide. Liquid $SiCl_4$ in an amount of 0.18 gram-moles per minute and 100 to 125 grams per minute of $AlCl_3$ at 300° C. were added to the titanium tetrachloride stream before its introduction into the reactor to promote the formation of pigmentary product.

The oxygen and titanium tetrachloride streams merged and reacted at a point within the reactor downstream from the concentric tubes due to the protecting chlorine shroud. A thermocouple located in the upper portion of the reaction zone measured the therein prevailing temperature as 1,160° C. The absolute pressure in the reactor was 16 pounds per square inch.

After an average reactor retention time above 10 seconds, an effluent pigmentary titanium dioxide product was withdrawn at the bottom of the reactor, and wet treated as disclosed in U.S. Pat. No. 3,146,119. A typical analysis for a pigmentary titanium dioxide product is represented in Table I.

TABLE I

| | |
|---|---|
| Tinting Strength | 1790 (Reynolds Scale) |
| Rutile Content | 99.0 percent |
| $SiO_2$ in Product | 0.41 percent by weight |
| $Al_2O_3$ in Product | 1.70 percent by weight |

The tinting strength of the pigment was determined in accordance with ASTM D-332-26, "*1949 Book of ASTM Standards*," Part 4, page 31, published by American Society for Testing Materials, Philadelphia, Pennsylvania.

The process was operated continuously for 97.5 hours during which time back electrode 1 lost 5.1 grams, an average of 0.052 gram per hour. During the same period, front electrode 8 lost 6.3 grams, an average of 0.065 gram per hour. Each electrode was consumed to a depth of about 0.16 inch measured from the inside surface. In cathode 1, the consumed length of the inside surface comprised the middle 20 percent. In anode 8, the consumed length of the inside surface comprised the lower 50 percent.

Electrode 1 was operated intermittently thereafter for a total of 1,132 hours during which it lost a total of 99 grams or an average of 0.087 gram per hour. Electrode 8 was operated intermittently thereafter for a total of 1,571 hours during which it lost a total of 236 grams or an average of 0.150 gram per hour.

EXAMPLE II

The conditions of Example I were repeated with new electrodes. Each electrode was a cast cylinder consisting essentially of 79.0 percent by weight silver and 21.0 percent by weight copper. The electrode dimensions were the same as in Example I. The cathode, back electrode 1, had an initial weight of 1,546.3 grams. The anode, front electrode 8, had an initial weight of 1,111.4 grams.

Each electrode was ultrasonically tested before initial use. Electrode 1 was found to have a few voids of about 480 microns and some insignificant smaller voids. One such void was calculated to be about 352 microns and the other about 176 microns. The total volume of the major voids, i.e., those of 480 microns and above, were calculated to be about 0.0003 volume percent based on the volume of the electrode. Electrode 8 was found to contain only one insignificant void below 480 microns.

The vapor phase oxidation process as described in Example I was operated continuously for 148.55 hours during which time back electrode 1 lost 37.7 grams, an average of 0.254 gram per hour. During the same period, front electrode 8 lost 34.2 grams, an average of 0.230 gram per hour. Upon analysis, the titanium dioxide product was found to be about the same as that in Table I.

Electrode 1 was operated intermittently thereafter for a total of 212 hours with a total loss of 48 grams or an average of 0.228 gram per hour. Electrode 8 was operated intermittently thereafter for a total of 906 hours with an average loss of 0.297 gram per hour.

EXAMPLE III

The oxygen flow conditions of Example I were repeated with new electrodes. However, there was no titanium tetrachloride or chlorine flow. Each electrode was a cast elongated cylinder consisting essentially of 79.56 percent by weight silver and 20.44 percent by weight copper.

The electrode dimensions were the same as in Example I. The cathode, back electrode 1, had an initial weight of 1,583.0 grams. The anode, front electrode 8, had an initial weight of 1,142.1 grams.

Electrode 1 was ultrasonically tested prior to initial use and found to contain about 15 voids based on observations of the Branson SONORAY 50 instrument. Seven voids were found to be about equal to the smallest standard (0.019 inch), and eight voids were found ranging from 0.020 to 0.023 inch in diameter. The total volume of such voids was calculated to be about 0.00176 percent of the volume of the electrode.

The plasma generator was operated continuously for 20.4 hours, at which time it was necessary to halt the operation because of heavy pitting in electrode 1. Electrode 1 was weighed and found to have lost 6.1 grams, an average of 0.30 gram per hour. Most of the loss was concentrated at the location of the voids, there being a cavity in that portion of the electrode. If the process had not been discontinued, the cavity would have eventually broken through the electrode wall and permitted entry of electrode cooling water into the system.

EXAMPLE IV

The conditions of Example III were repeated with new electrodes. Each electrode was a cast cylinder consisting essentially of 80.0 percent by weight silver and 20.0 percent by weight copper. The electrode dimensions were the same as in Example I. The cathode, back electrode 1, had an initial weight of 1,585.15 grams. The anode, front electrode 8, had an initial weight of 1,146.75 grams.

Electrode 1 was ultrasonically tested prior to initial use and found to contain a total of 17 major voids with numerous minor voids, at least 100, scattered throughout. Of the 17 major voids, four had an ultrasonic response equal to the smallest standard (480 microns), 12 had a response greater than the smallest standard but less than the middle standard (one thirty-second inch or about 790 microns); and one had a response greater than the middle standard (about 840 microns). Electrode 1 was also tested prior to initial use by means of X-ray photograph; however, examination of the X-ray film did not reveal the presence of any voids. The major voids, i.e., those equal to and above the smallest standard, comprised more than 0.0027 volume percent of the total electrode volume to be consumed by arc operation.

The process was operated continuously for 23.7 hours at which time it was necessary to halt the operation because of heavy pitting in electrode 1. Electrode 1 was weighed and found to have lost 10.15 grams, or an average of 0.429 gram per hour.

If the process had been continued, the electrode would have structurally failed within a short time. The weight loss of electrode 8 was very slight.

EXAMPLE V

The conditions of Example I were repeated in a titanium tetrachloride vapor phase oxidation process with the back electrode 1 of Example I as the cathode and front electrode 8 from Example II as the anode. The back electrode had an initial weight of 1,534.3 grams and the front electrode had an initial weight of 1,085.1 grams.

The process was operated continuously for 102.8 hours. Electrode 1 suffered a weight loss of 16.8 grams, an average of 0.163 gram per hour. Electrode 8 suffered a loss of 17.9 grams, an average of 0.174 gram per hour.

A typical pigment analysis is shown in Table II.

TABLE II

| | |
|---|---|
| Tinting Strength | 1810 |
| Rutile Content | 99.5 percent by weight |
| $SiO_2$ in Product | 0.43 percent by weight |
| $Al_2O_3$ in Product | 1.68 percent by weight |

EXAMPLE VI

The conditions of Example I were repeated in a titanium tetrachloride vapor phase oxidation process with the back electrode 1 of Example I as the cathode and the front electrode 8 of Example III as the anode. The back electrode had an initial weight of 1,517.6 grams and the front electrode had an initial weight of 1,019.5 grams.

The process was operated continuously for 163.0 hours. Electrode 1 suffered a weight loss of 16.7 grams, an average of 0.103 gram per hour. Electrode 8 suffered a weight loss of 41.5 grams, an average of 0.255 gram per hour.

A typical pigment analysis is shown in Table III.

TABLE III

| | |
|---|---|
| Tinting Strength | 1720 |
| Rutile Content | 98.5 percent by weight |
| $SiO_2$ in Product | 0.46 percent by weight |
| $Al_2O_3$ in Product | 1.72 percent by weight |

EXAMPLE VII

The conditions of Example III were substantially repeated successively with three electrodes similar in dimensions to those described in Example I but with different compositions. Electrode (7–1) corresponding to electrode 8 in the drawing was fabricated by drawing and had a composition of about 90 weight percent silver and 10 weight percent copper. This electrode was ultrasonically tested prior to initial use and found to be free of voids greater than the smallest standard (0.019 inch) and essentially free of background indications. Background indications refer to reflections observed with the SONORAY 50 that are considerably smaller than the reflections obtained from the smallest standard.

Electrode (7–2) corresponding to electrode 8 in the drawing was fabricated by a continuous cast method and had a composition of about 72 weight percent silver and about 28 weight percent copper. This electrode was tested ultrasonically prior to use and found to be free of voids greater than the smallest standard and essentially free of background indications.

Electrode (7-3) corresponding to electrode 1 in the drawing was also fabricated by continuous casting and had a composition of about 72 weight percent copper and about 28 weight percent silver. This electrode, having the dimensions of electrode 1 in Example I, was tested ultrasonically prior to use and found to be free of voids greater than the smallest standard and essentially free of background indications.

The results of the use of these electrodes are tabulated in Table IV.

TABLE IV

| Electrode | Total Hours Run | Loss (grams/hour) |
| --- | --- | --- |
| 7-1 | 368 | 0.355 |
| 7-2 | 782 | 0.083 |
| 7-3 | 1062 | 0.106 |

All of the electrodes ultrasonically tested in accordance with the procedures described hereinabove were given a rating of from 0 to 5 in accordance with the definitions listed in Table V.

TABLE V

| Rating | Qualifications |
| --- | --- |
| 0 | Free of indications greater than the smallest standard; substantially free of background indications. |
| 1 | Free of indications greater than the smallest standard; small amount of background, or One or two indications equal to smallest standard; substantially free of background indications. |
| 2 | One or two indications equal to smallest standard; small amount of background. |
| 3 | Several indications equal to smallest standard; some or moderate background indications. |
| 4 | Several indications equal to size of from smallest to medium moderate background indications. |
| 5 | Many separate indications of any standard with or without considerable background indications. |

The ratings assigned to the electrodes of Examples I–VII are tabulated in Table VI.

TABLE VI

EXAMPLE

| Electrode | 1 | 2 | 3 | 4 | 7-1 | 7-2 | 7-3 |
| --- | --- | --- | --- | --- | --- | --- | --- |
| Cathode (1) | 0 | 3 | 5 | 5 | — | — | 0 |
| Anode (8) | 0 | 1 | — | — | 0 | 0 | — |

The data of Examples I–VII show that an electrode, e.g., the cathode of Example I, that is substantially void free has approximately one-fifth the rate of wear of an electrode, e.g., the cathode of Example IV, that is not void free. The data further show that electrodes that have an ultrasonic rating (see Table V) of 3 or below will have acceptable wear, as represented by weight loss in grams per hour. Thus, it is necessary that electrodes be substantially void free, as measured by the ultrasonic test heretofore described, in order that they have a useful life when used to generate gaseous plasmas, particularly plasmas of corrosive gases. Moreover, electrodes which have passed conventional X-ray photographic examination are not always suitable for generating gaseous plasmas.

It is to be understood that any of the above teachings can be employed in any vapor phase oxidation process for producing pigmentary metal oxide either in the absence or presence of a fluidized bed.

Although this invention has been described with particular reference to the production of pigmentary titanium dioxide, it is equally applicable to the production of other metal oxides. The term metal as used herein is defined as including those element exhibiting metal-like properties including the metalloids.

Examples, not by way of limitation, of pigmentary metal oxides which may be produced by the aforementioned process are the oxides of aluminum, arsenic, beryllium, boron, gadolinium, germanium, hafnium, lanthanum, iron, phosphorus, samarium, scandium, silicon, strontium, tantalum, tellurium, terbium, thorium, thulium, tin, titanium, yttrium, ytterbium, zinc, zirconium, niobium, gallium, antimony, lead and mercury.

What is claimed is:

1. In an electric arc gas heater having a cathode electrode, an anode electrode, and electrical means for connecting said electrodes to a source of supply of direct current, the improvement which comprises:
an electrode which is one of said cathode and anode electrodes and which, when ultrasonically tested prior to use, is shown to contain less than about 0.0005 volume percent of voids of at least about 0.019 inch in any dimension in the area of the electrode eroded by arc operation.

2. An electric arc gas heater as set forth in claim 1, wherein said electrode has not greater than 0.0001 volume percent voids of at least 0.019 inch in any dimension in the area of the electrode eroded by arc operation.

3. An electric arc gas heater as set forth in claim 1, wherein said electrode is a metallic material consisting essentially of from 72 to 100 percent, by weight, silver and from 28 to 0 percent, by weight copper.

4. An electric arc gas heater as set forth in claim 1, wherein said electrode is a metallic material consisting essentially of 80 percent, by weight, of silver and 20 percent by weight, of copper.

* * * * *

PO-1050
(5/69)

UNITED STATES PATENT OFFICE
CERTIFICATE OF CORRECTION

Patent No. 3,743,781               Dated July 3, 1973

Inventor(s)   Calvin B. Holden

It is certified that error appears in the above-identified patent and that said Letters Patent are hereby corrected as shown below:

IN THE TITLE

"METHOD FOR INCREASING LIFE OF PLASMA ARC ELECTRODES" should read

---ELECTRIC ARC GAS HEATER HAVING AN ELECTRODE CONTAINING A LOW VOLUME PERCENT OF VOIDS---

Signed and sealed this 12th day of March 1974.

(SEAL)
Attest:

EDWARD M. FLETCHER, JR.                C. MARSHALL DANN
Attesting Officer                      Commissioner of Patents